United States Patent
Wade (10) Patent No.: US 11,655,866 B2
(45) Date of Patent: May 23, 2023

(54) DISC BRAKE PAD SPRING

(71) Applicant: Meritor Heavy Vehicle Braking Systems (UK) Limited, Gwent (GB)

(72) Inventor: Alexander Wade, Gwent (GB)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 155 days.

(21) Appl. No.: 17/129,409

(22) Filed: Dec. 21, 2020

(65) Prior Publication Data
US 2021/0207669 A1 Jul. 8, 2021

(30) Foreign Application Priority Data
Jan. 8, 2020 (EP) ..................................... 20150815

(51) Int. Cl.
*F16D 65/097* (2006.01)
*B60T 1/06* (2006.01)
*F16D 55/22* (2006.01)
*F16D 65/092* (2006.01)

(52) U.S. Cl.
CPC .......... *F16D 65/0978* (2013.01); *B60T 1/065* (2013.01); *F16D 55/22* (2013.01); *F16D 65/092* (2013.01); *F16D 2200/0021* (2013.01)

(58) Field of Classification Search
CPC ............... F16D 65/0978; F16D 65/092; F16D 2200/0021; F16D 55/22; F16D 65/0975; F16D 65/0976; B60T 1/065
See application file for complete search history.

(56) References Cited

U.S. PATENT DOCUMENTS

| 3,625,316 A | 12/1971 | Mori |
| 2010/0116600 A1* | 5/2010 | Wolf, Jr. ............. F16D 65/0978 188/73.31 |

FOREIGN PATENT DOCUMENTS

| CN | 103527681 A | 1/2014 |
| CN | 104632946 A | 5/2015 |
| DE | 0469310 A1 * | 2/1992 |
| DE | WO-2007/051615 A1 * | 5/2007 |
| EP | 0694707 A2 | 1/1996 |
| EP | 1698795 A1 | 9/2006 |
| EP | 2184506 A | 5/2010 |
| GB | 2566335 A | 3/2019 |
| JP | 2005291331 A | 10/2005 |

OTHER PUBLICATIONS

Extended European Search Report dated Jun. 22, 2020, for related European Appln. No. 20150815.7; 7 Pages.
Chinese Office Action dated Jun. 10, 2022, for related China Appln. No. 202011554280.2; 7 Pages.

* cited by examiner

*Primary Examiner* — Pamela Rodriguez
(74) *Attorney, Agent, or Firm* — Brooks Kushman PC (57) ABSTRACT

A disc brake and a pad spring for a brake pad assembly. The pad spring may include first and second arms that extend from an intermediate portion and that each have a free end. The free end of each arm may curve outwardly relative to an intermediate portion and back towards a plane.

20 Claims, 7 Drawing Sheets

DISC BRAKE PAD SPRING

TECHNICAL FIELD

The present teachings relate to a pad spring for a brake pad assembly.

BACKGROUND

Known disc brake pad assemblies for heavy vehicles such as trucks, semi-trailers, buses and coaches comprise, amongst other features, a brake caliper, a brake carrier, brake pads, a pad retainer, pad springs and a brake disc. The disc is mounted to a wheel hub for rotation with a vehicle wheel. The brake caliper is fixed relative to the axis of rotation of the disc and is secured to a non-rotating portion of the vehicle. The brake pads comprise a friction material mounted on a rigid backplate and are slidably fitted to the brake caliper. They are positioned either side of the disc, with the friction material facing the disc. Braking is achieved by pushing one or more of the pads towards the disc. References to axial, radial, circumferential or tangential directions relate to the axis of rotation of the disc.

Disc brake pad assemblies are known to have leaf-type pad springs to restrain radially outward movement of the pads in the carrier, whilst permitting movement towards and away from the associated brake disc and to inhibit rattling of the pad in use.

The pad springs are typically elongate and extend along a portion of the radially outermost face of the brake pad backplate when fitted. Pad springs are typically pre-loaded to a certain extent against the carrier by the pad retainer that contacts the approximate center of the spring. This force is reacted radially outwards by the spring contacting the backplate proximate each end of the spring. Formations are also typically provided on the backplate and/or the pad spring to retain the pad spring on the backplate during movement of the pad parallel to the axis of rotation of the disc.

Some known pad springs comprise a single, long, curved main body portion, each end of this portion being curved away from the curvature of the main body portion. The curved main body portion is forced into straightening to some degree upon application of the load by the pad retainer. This causes stress concentrations in the center of the spring, which can reduce the service life of the device, requiring the use of a thicker material than would otherwise be necessary for fulfilling the purpose described above.

European patent publication 0694707 discloses a pad spring with a flat central portion, with two arms extending therefrom. The arms are joined to the central portion via a discontinuity, which under operating loads can incur heavy stresses. Furthermore, manufacturing this more complex shape is costly and produces points of weakness within the device. Under the load applied by the pad retainer, the load is reacted by each arm in bending, causing a stress concentration at the discontinuity.

The present teachings seek to overcome or at least mitigate the problems of the prior art.

SUMMARY

A first aspect of the teachings provides a pad spring for a brake pad assembly, the spring having a straight intermediate portion having opposite first and second ends and defining a plane, a first arm extending, without discontinuity, from the first end of the intermediate portion, inclined out of the plane and a second arm extending without discontinuity from the second end of the intermediate portion inclined out of the plane on the same side of the plane as the first arm, each arm having an intermediate portion end and an opposite, free end, the free end of each arm curving outwardly relative to the intermediate portion and back towards the plane, each curved end describing an angle of at least 120°.

This pad spring allows for a more even and advantageous distribution of load when fitted to a corresponding brake pad backplate. That is, it ensures that stress is not concentrated in a portion of the spring more likely to fail. Furthermore, the pad spring is easy to manufacture. The pronounced curve of the ends of the arms results in stresses being reacted with a substantial resultant in the circumferential direction which loads the arms more in compression, less in bending.

Optionally, at least one of the arms has major portion having an arcuate shape, preferably of a radius of 250 mm to 400 mm.

A curve in this location may assist preferential of stress distribution throughout arm and ensures that any arm bending is in a predetermined direction.

Optionally, at least one of the arcuate shaped arms has a center of curvature radially outward of the spring.

A curve in this direction may further enhance the stress distribution throughout the arm and may assist in keeping the intermediate portion in a planar condition.

Optionally, the spring is formed from material having a thickness less than 1.6 mm, preferably 0.8 mm to 1.4 mm, e.g., 1.2 mm.

This means the spring may be lighter than known pad springs for disc brakes of a comparable size. A thinner, lighter, spring that can provide comparable or enhanced performance to prior art springs is advantageous.

Optionally, at least one of the arms is formed from two parallel, spaced, elements to form an aperture therebetween, preferably wherein the aperture extends up to the straight intermediate portion.

This makes the arms relatively more flexible and promotes flexing of the arms as opposed to the intermediate portion. This arrangement may also reduce stress raising locations in the arm.

The aperture formed between the elements may be obround in shape, and optionally the aperture formed between the elements lies in the center of the width of the arm.

Optionally, at least one of the arms extends at an angle of 20° to 40° from the straight intermediate portion, optionally in which said angle is c.25° (e.g., approximately 25°), preferably in which the angle by which each arm extends relative to the plane is the same.

This has been found to further promote the axial loading of the arms in compression, and the reduction of unwanted stresses.

Optionally, at least one curved end describes an angle of at least 180°.

A curved end ensures preferential distribution of stress from the spring to the depression of the backplate or spreader plate.

Optionally, the straight intermediate portion is 5 to 15 mm long in the tangential direction and/or is 10 mm to 20 mm wide in the axial direction.

This has been found to further promote the axial loading of the arms in compression, and the reduction of unwanted stresses.

Optionally, at least one of the arms is 45 mm to 50 mm long in the circumferential direction, measured when in a flat condition before forming.

This has been found to further promote the axial loading of the arms in compression, and the reduction of unwanted stresses.

Optionally, the spring is symmetrical about the center of the straight intermediate portion when viewed in the axial direction.

This advantageous in a situation in which the packaging constraints prefer a symmetrical design, or the forces acting upon the disc brake pad assembly 10 in the circumferential direction are roughly equal.

Optionally, the spring may be asymmetrical about the center of the straight intermediate portion when viewed in the axial direction.

Optionally, the spring is made from metal or another suitable material, optionally high carbon steel.

Preferably materials have the properties to cope with the loading and provide the require spring constant, whilst still being light and resistant to corrosion and fatigue.

A second aspect of the teachings provides a disc brake pad spring assembly, the assembly having a pad spring according to the first aspect and a mounting plate, the mounting plate having opposing spaced abutments defining abutment depressions, the free ends of the pad spring arms fitting into the abutment depressions in a circumferentially restrained manner, such that application of a load to the pad spring at the straight intermediate portion results in stresses being reacted with a substantial resultant in the circumferential direction.

This assembly allows for an advantageous distribution of stress concentrations throughout the pad spring. That is, it ensures that stress is not concentrated in a portion of the spring more likely to fail. Furthermore, the components of the assembly are easy to manufacture. The pronounced curve of the ends of the arms in conjunction with abutments constrains circumferential movement of the arms resulting in the arms being loaded more in compression, less in bending.

Optionally, the ratio of the circumferential lengths of the pad spring and backplate is 1:3 to 1:1.9, optionally 1:2.7 to 1:2.

The relatively short length of the pad spring versus the backplate (compared to the prior art) may further reduce the amount of material required and mass thereof.

A third aspect of the teachings provides, a brake disc pad assembly containing a spring of the first aspect.

A fourth aspect of the teachings provides a heavy vehicle disc brake comprising a brake pad assembly of the third aspect.

BRIEF DESCRIPTION OF THE DRAWINGS

Embodiments will now be described, by way of example only, with reference to the accompanying figures, in which:

FIG. 6 is an axial view of a pad spring and a central, radially outwards portion of an assembly according to the first and second aspects of the present teachings;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIGS. 1 to 4 show a pad spring 20 according to the first aspect of the present teachings. Pad spring 20 includes a straight, intermediate portion 22 that defines a plane P. This portion 22 has a first end 24 and a second end 26, the ends being opposite to one another. The straight, intermediate portion 22 is 12 mm long in the circumferential direction. The straight, intermediate portion is 14.5 mm wide in the axial direction in this embodiment. In other embodiments the straight portion may be in a range of 5 mm to 15 mm long, for example.

The pad spring 20 also includes a first arm 28 and a second arm 34. The first arm 28 has a free end 30 and an intermediate portion end 32. The free end 30 and intermediate portion end 32 are opposite one another. Likewise, second arm 34 has a free end 36 and an opposite, intermediate portion end 38.

The first arm 28 extends, without discontinuity, from the first end 24 of the intermediate portion 22. The first arm 28 extends from the first end 24 inclined out of the plane defined by the intermediate portion 22. That is, between the first end 24 of the intermediate portion 22 and the intermediate portion end 32 of arm 28 there is a single arcuate transition portion 25 whose center of curvature is radially inward of the pad spring as installed. This arcuate transition portion forms a smooth transition from the intermediate portion 22 to the first arm 28. Likewise, the second arm 34 extends without discontinuity from the second end 26 of the intermediate portion 22 in the same manner as the first. The second arm 34 extends inclined out of the plane defined by the intermediate portion 22 on the same side of the plane as the first arm 28.

Both arms 28, 34 extend from the plane P defined by the straight, intermediate portion 22 at an angle in the range of 20° to 35° in a free (unfitted) condition. In this embodiment the angle is approx. 31° in the free condition and 25° in the fitted condition.

The arms 28, 34 curve in the opposite direction to the transition portion. That is the centers of curvature of the arms 28 and 34 are radially outward of the pad spring 20. A major portion of each arm has a shallow curvature—i.e., the radius of curvature is relatively large—in a range of 250 mm to 400 mm, approximately 325 mm in this embodiment. The direction of curvature is back towards the plane P.

The respective free ends 30, 36 of each arm 28, 34 transition into a tighter curve having a radius of 4.5 mm in this embodiment, but typically in a radius of 3 mm to 10 mm. The center of curvature is also located radially outward of the pad spring 20 (i.e., each arm curves outwardly along its length, but the curve tightens at the free ends. The free ends curve, in this embodiment to the end that start to curve back towards the remainder of the arm. Each curved end 30, 36 describes an angle of approximately 230°, although smaller angles are possible as long as they are greater than 120°. Both arms 28, 34 are 55 mm long in the circumferential direction. This is when measured in a flat condition before any forming or shaping takes place.

Figure 3:
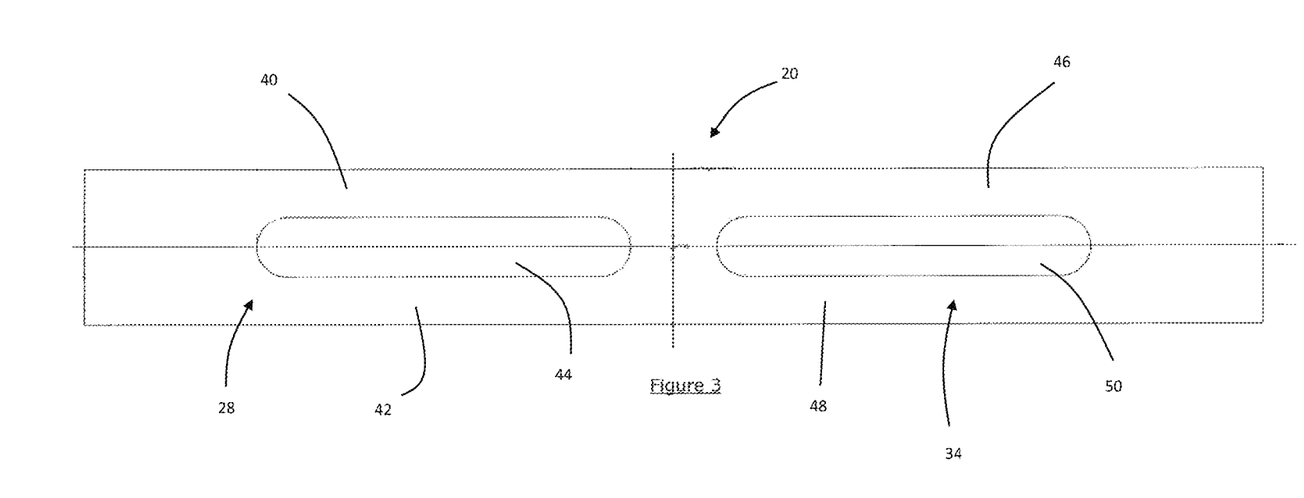
FIG. 3 is a radial view of the underside of the pad spring of FIG. 1 looking in the direction of arrow B in FIG. 1.
Figure 4:
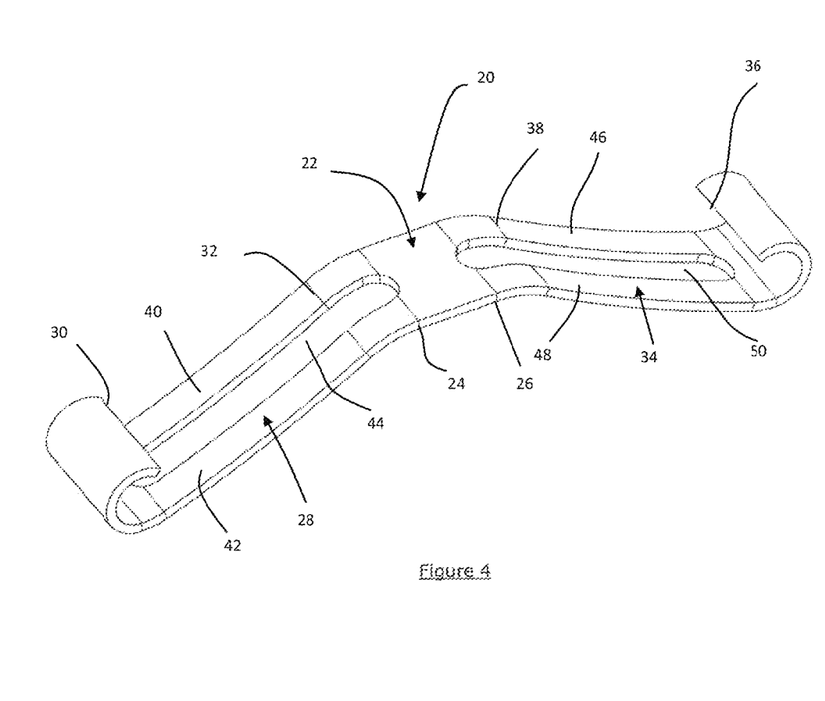
FIG. 4 is an isometric view of a pad spring of FIGS. 1 to 3.

As shown in FIGS. 3 and 4, the first arm 28 is formed over the majority of its length from two parallel elements 40, 42 to form an aperture 44 therebetween. Likewise, the second arm 34 is formed from two mutually aligned, spaced, elements 46, 48 to form an aperture 50 therebetween. The apertures 44, 50 are obround in shape and lie in the center of the width of the corresponding arm 28, 34. The apertures 44, 50 extend for the majority of the length of each arm and are around 5 mm wide. In this embodiment each aperture at least reaches the intermediate portion 22 at a first end, at extend the complete length of the region of shallow curvature, terminating at the transition from the shallow curvature to the tighter curve at the free ends 30, 36.

Figure 1:
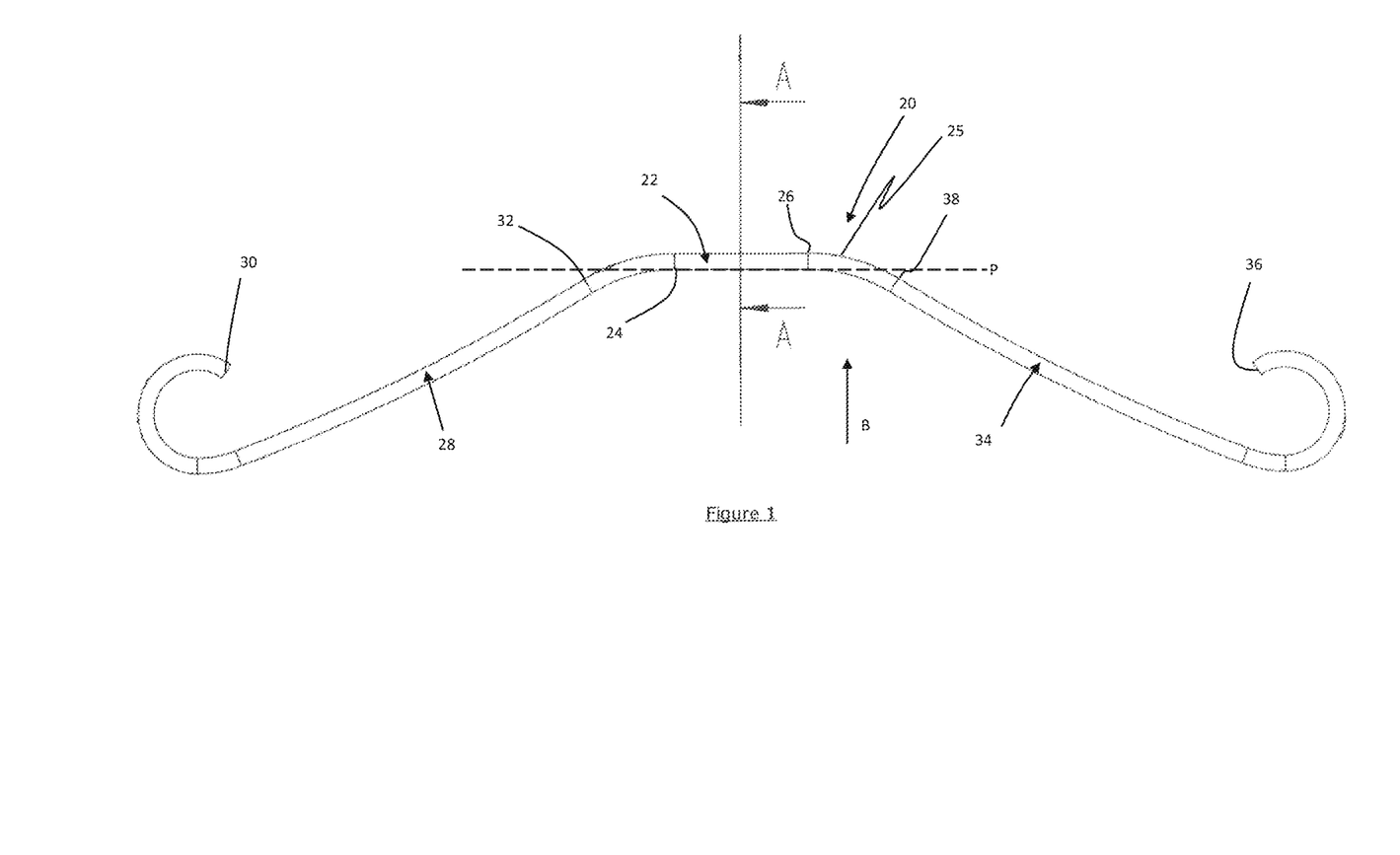
FIG. 1 is an axial view of a pad spring according to the first aspect of the present teachings in the free condition.
Figure 2:
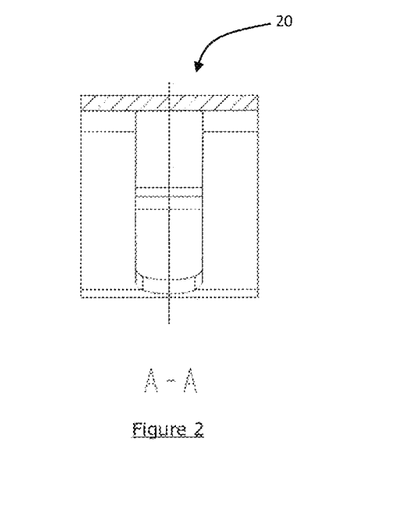
FIG. 2 is a cross-section of the pad spring of FIG. 1 taken on line A-A in FIG. 1.

The pad spring 20 is symmetrical about the center of the straight, intermediate portion 22, when viewed in the axial direction (as shown in FIG. 1). Alternatively, the pad spring 20 may be asymmetrical about the center of the straight, intermediate portion 22, when viewed in the axial direction. A symmetrical or asymmetrical pad spring 20 brings different benefits, which will be described in more detail below.

In this embodiment, the pad spring 20 is formed from 1.2 mm thick material but may typically be in a range from 1 mm to 1.4 mm thick material. The pad spring 20 is made from high carbon steel, typically which has been heat treated, although it can be made from any other suitable material. A suitable material is generally defined as one that is as light as possible, whilst having the mechanical properties to withstand the stress exerted upon the pad spring 20 in use, for an appropriate service life and lends itself to the manufacturing process.

Figure 8:
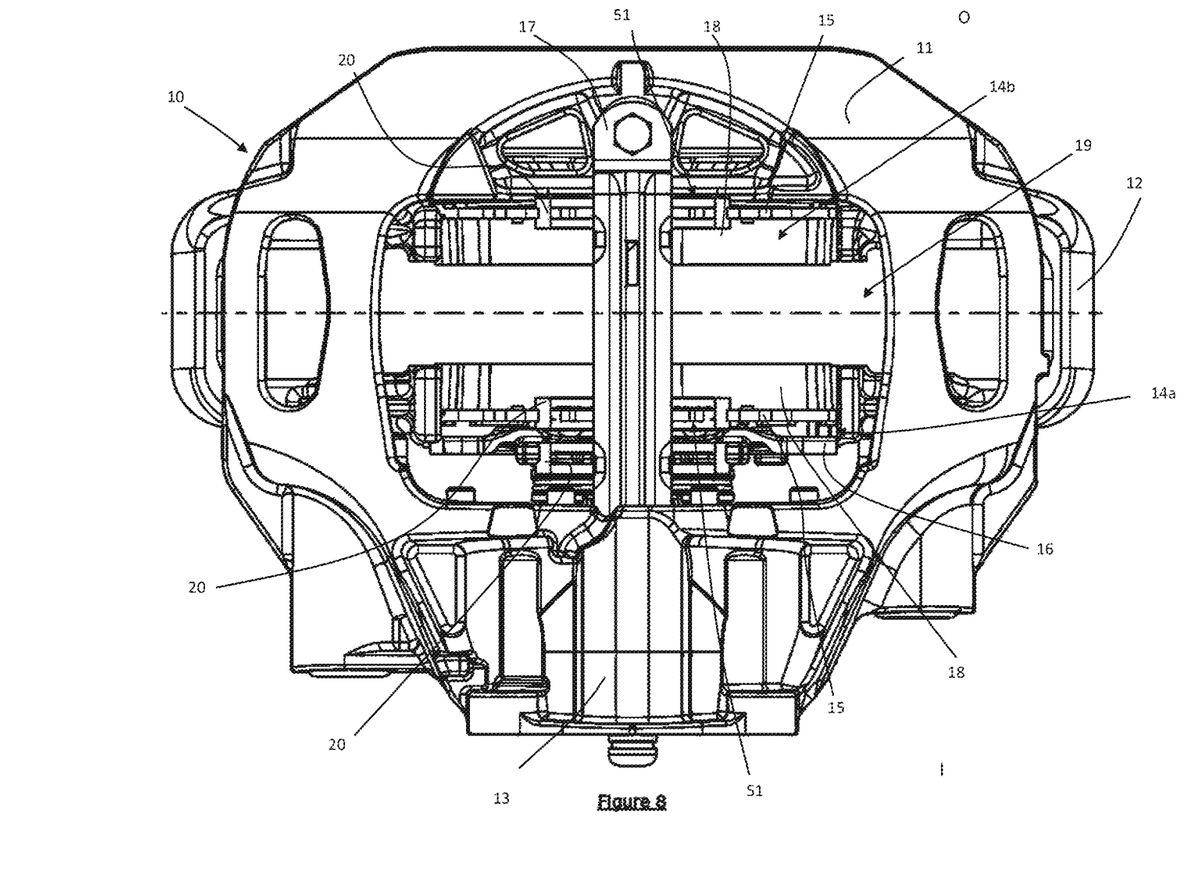
FIG. 8 is a radial view of a brake caliper, a brake carrier, pad spring and assembly of FIGS. 5, 6 and 7, looking in the radially inward direction.

FIG. 8 shows the first and second aspects of the present teachings within a disc brake pad assembly 10 of a type utilized for heavy vehicles such as trucks, buses and coaches. The directions inboard I and outboard O refer to the typical orientation of the disc brake pad assembly 10 when fitted to a vehicle and with reference to a longitudinal center line of the vehicle.

The disc brake pad assembly 10 comprises a brake caliper 11 slidably mounted with respect to a brake carrier 12 by two guide assemblies (not shown). The caliper 20 has a housing 13 typically formed from cast iron or steel. The carrier 12 is typically also formed from cast iron or steel.

The brake carrier 12 carries an inboard brake pad 14a and an outboard brake pad 14b. A rotor or disc (not shown) is rotatable about an axis extending in the axial direction and is positioned between the brake pads 14a and 14b. An air actuator (not shown) is provided to move the inboard brake pad 14a into frictional contact with the rotor or disc via a suitable actuation mechanism (not shown) housed within the caliper housing 13 and which acts on the inboard brake pad 14a. When the inboard brake pad 14a is pushed towards and contacts the rotor or disc, the caliper 11 is then caused to slide inboard along first and second caliper guide assemblies.

As the caliper 11 slides inboard it moves the outboard brake pad 14b towards the rotor or disc. Hence, the rotor or disc becomes clamped between the inboard and outboard brake pads and the rotation of the rotor or disc is frictionally inhibited.

The outboard brake pad 14b is formed of a backplate 15 of substantially rigid material, mounted to which is relatively brittle friction material 18. The inboard brake pad 14a is formed of a backplate 15, mounted to which is friction material 18. A spreader plate 16 is interposed between the inboard brake pad 14a and the actuation mechanism to distribute the load exerted on the inboard brake pad 14a by the actuation mechanism across a larger area of the backplate 15 for better wear characteristics. The backplates 15 are typically manufactured from stamped or cast steel that is 5-12 mm thick.

A pad retainer 17 is secured to the brake caliper 11. This pad retainer 17 applies a pre-load to the pad springs 20, which in turn are fitted to the backplates 15 and the spreader plate 16 of the disc brake pad assembly 10. Removal of the pad retainer 17 during maintenance operations allows the replacement or inspection of the brake pads 14a and/or 14b through a radial opening 19 in the brake caliper 11 without the need to dismount the brake caliper from the brake carrier 12. This is significant for heavy vehicle disc brakes, as the mass of the heavy vehicle calipers makes their dismounting an operation it is not safe for a single maintenance technician to perform alone.

The pad springs 20 allows the backplates 15 and spreader plate 16 to slide towards the rotor on the brake carrier 12, whilst minimizing rattling and impacts between the pads 14a, b and the carrier 12 or retainer 17 that may cause damage to the contact surfaces.

Figure 5:
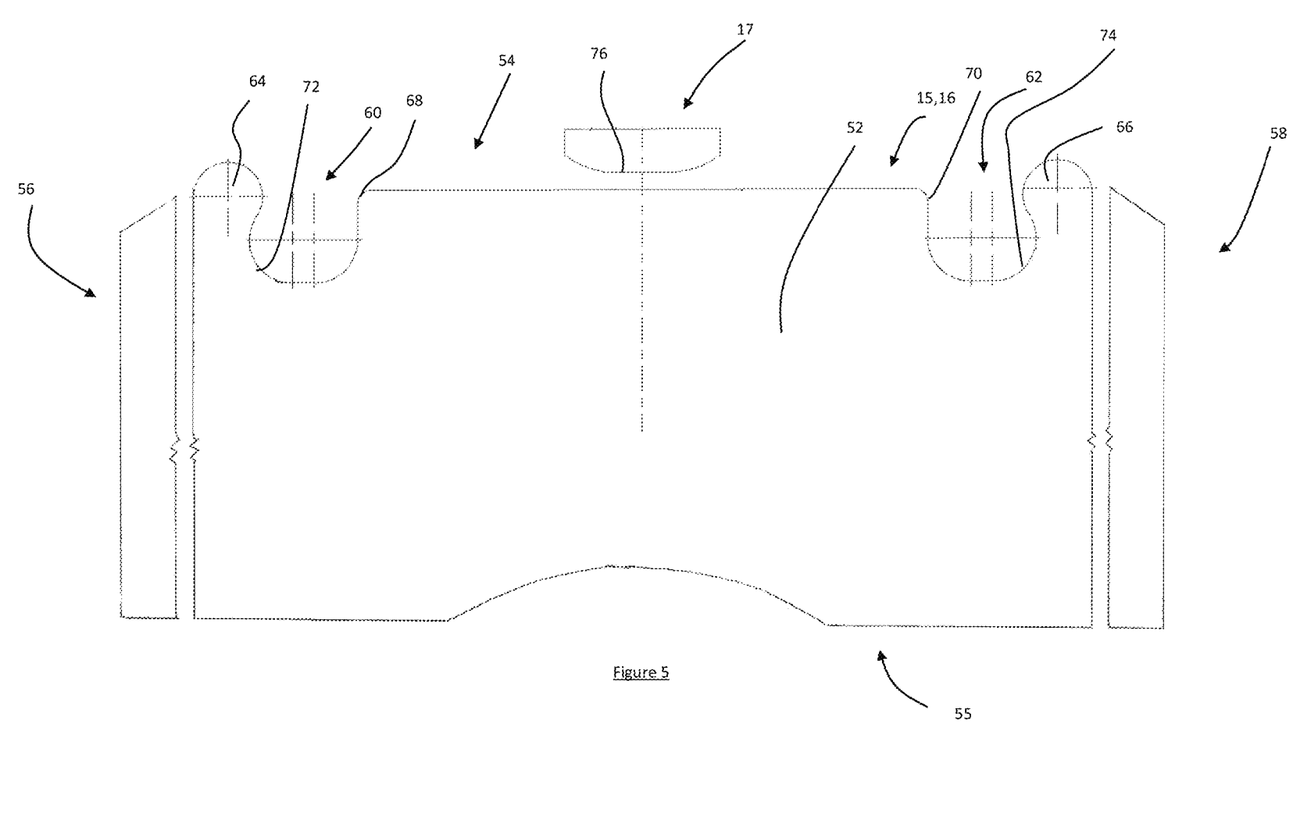
FIG. 5 is an axial view of a backplate and pad retainer for use with the pad spring of FIG. 1.
Figure 7:
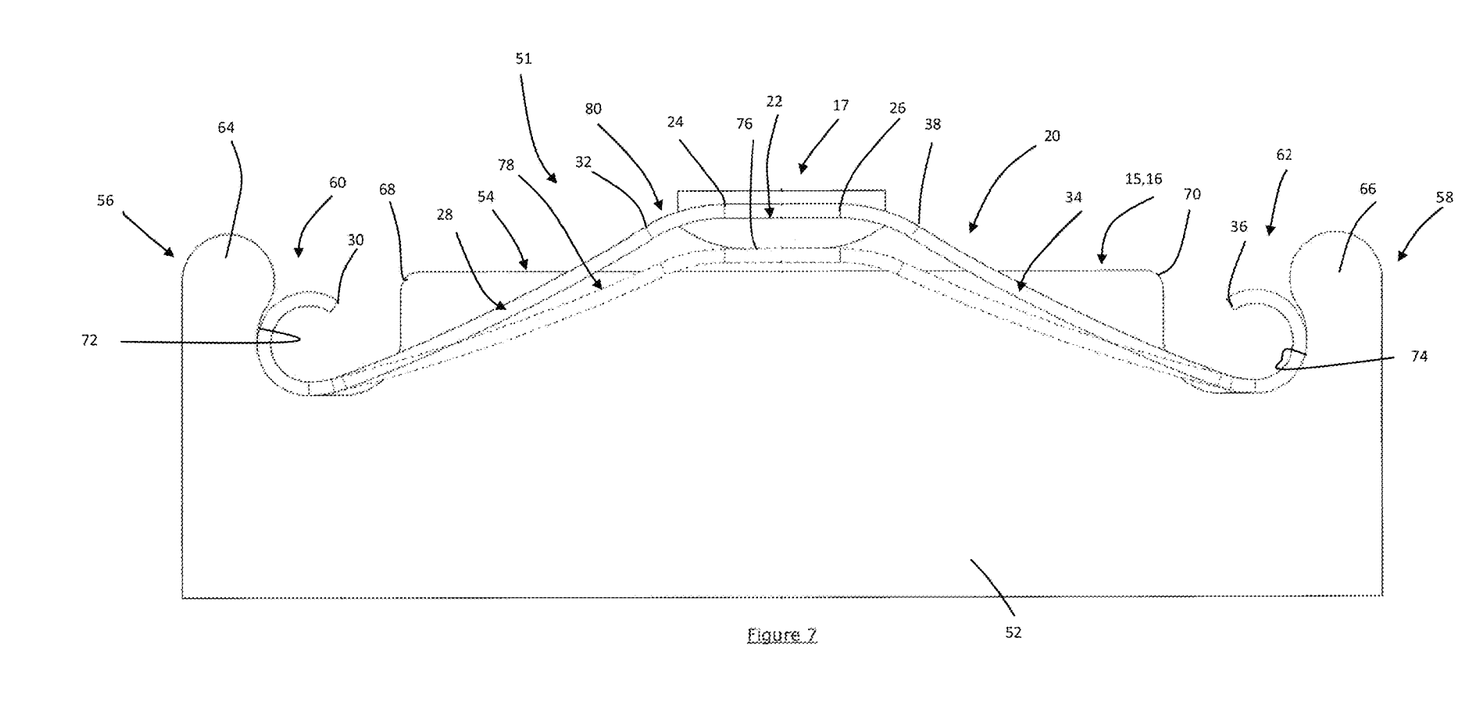
FIG. 7 is an axial view of the pad spring and a central, radially outwards portion of an assembly of FIG. 6 in both the free and fitted conditions.

Referring to FIGS. 5 to 7, the pad spring 20 is substantially similar to the one shown in FIGS. 1 to 4. Parts corresponding to parts in FIGS. 1 to 4 carry the same reference numerals.

FIG. 5 shows a backplate 15 or spreader plate 16 and the pad retainer 17 of a disc brake pad spring assembly.

The backplate 15 and spreader plate 16 contain a radially outward edge 54, a radially inward edge 55, a circumferentially leading edge 56 and a circumferentially trailing edge 58. The inward edge 55, leading 56 and trailing 58 edges are supported by corresponding surfaces of the brake carrier 12. In addition, the backplate 15 contains a friction material mounting surface 52. The terms "leading" and "trailing" relate to the direction of rotation of the brake disc in forward travel of the vehicle, the leading edge being the edge encountered first by the brake disc in each rotation.

Moving from the center of the backplate 15 (proximal to the pad retainer 17) towards the circumferentially leading edge 56, the radially outward edge 54 has a depression 60, then a lobe 64. Likewise, in the opposite direction, towards second end 56, there is a depression 62, then a lobe 66. Both depressions 60, 62 (when travelling from the center of the radially outward edge 54) have a corner 68, 70 acting as a projection to pass through apertures 44, 50 and an inner surface 72, 74. As can be seen from FIG. 5 and FIG. 8, the backplate 15 and spreader plate 16 extend circumferentially beyond the dimensions shown in FIG. 5.

As can be seen in FIG. 8, the circumferential length of the backplates 15 and spreader plate 16 is more than twice that of the pad spring 20, in this embodiment. In other embodiments the relative lengths may be in a range of 1:3 to 1:1.9.

The pad retainer 17 has a planar load surface 76. This surface 76 faces radially inward towards, and is parallel to, the radially outward edge 54 of backplate 15 and spreader plate 16 when assembled.

FIGS. 6 and 7 show a central, radially outward portion of a pad spring assembly 51, in which the pad spring 20 of FIGS. 1 to 4 fits with the backplate 15 or spreader plate 16 (collectively referred to as a mounting plate) and pad retainer 17 of FIG. 5.

The pad spring 20 fits with the backplate 15 and the spreader plate 16 such that the arms 28, 34 are inclined out of the plane defined by the intermediate portion 22 towards the friction surface 52. FIG. 6 shows the pad spring 20 in a pre-loaded condition 78, whilst FIG. 7 shows the pad spring 20 in the pre-loaded condition 78 (in broken lines) and a free condition 80 (in unbroken lines). The maximum travel the pad spring 20 is subjected to under normal use is when the straight, intermediate portion 22 contacts the radially outward edge 54 when fitted to the backplate 15 or spreader plate 16. This constitutes the maximum load on the pad spring 20. This may correspond to the backplate 15 or spreader plate 16 lifting off the carrier 12 as a result of travel over an uneven road surface, for example. In this embodiment the travel is approximately 0.6 mm but may vary between 0.4 mm and 2 mm in other embodiments.

The pad spring 20 is fitted to the backplate 15 or spreader plate 16 such that the curvature of the free ends 30, 36 of the pad springs 20 are substantially concentric with the curvature of the inner surfaces 72, 74 of the depressions 60, 62 of the backplate 15 to spreader plate 16. The material of corners 68, 70 of the backplate 15 or spreader plate 16 passes through the apertures 44, 50 of the pad spring 20. A pre-load is exerted upon the pad spring 20 via the pad retainer 17, the load surface 76 of which is in contact with the radially outward surface of the straight intermediate portion 22 of pad spring 20.

As shown in FIG. 7, the application of the pre-load and load under maximum travel to the pad spring 20 by the pad retainer 17 causes a bending/compression of the pad spring arms 28, 34. However, the curvature of the free ends 30, 36 of the arms 28, 34 are substantially unchanged. Furthermore, the intermediate portion 22 of pad spring 20 remains straight under the pre-load and load due to the maximum travel described above.

The concentric inner surfaces 72, 74 and free ends 30, 36 result in preferential contact surfaces that ideally distribute the stress throughout the arms 28, 34 which results in the stresses being reacted with a substantial resultant in the circumferential direction. This loads the arms 28, 34 more in compression and less in bending. This may result in an increased service life of the pad spring 20. The interaction between the inner surfaces 72, 74 and free ends 30, 36 also ensures there is no circumferential movement of the pad spring 20 in use. The lobes 64, 66 are shaped such that the curved, free ends 30, 36 of arms 28, 34 cannot move radially outward when the pad spring 20 is fitted.

The straight intermediate portion 22 also ensures that the load applied by pad retainer 17 is absorbed by the pad spring 20 predominantly via compression of the arms 28, 34, resulting in additional bending of the major part of the arms (a reduction in their radius of curvature) rather than the bending of the intermediate portion 22. As such, the stresses in pad spring 20 are ideally distributed, whilst maintaining a large contact area between the pad retainer 17 and the intermediate portion.

The material of rounded corners 68, 70 passing through apertures 44, 50 restricts movement of the pad spring 20 in the axial direction and further minimize rattling when in use.

In some embodiments, the pad spring 20 is symmetrical about the center of the straight, intermediate portion 22 when viewed in the axial direction. This is more suited to a situation in which the packaging restraints prefer a symmetrical design, or the forces acting upon the disc brake pad assembly 10 in the circumferential direction are roughly equal. In other embodiments, the pad spring 20 is asymmetrical about the center of the straight, intermediate portion 22 when viewed in the axial direction. This may be the case if one or both of the brake pads are circumferentially offset from the carrier centerline of action of the actuation mechanism.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A pad spring for a brake pad assembly, the pad spring comprising:
a straight intermediate portion having opposite first and second ends and defining a plane;
a first arm extending via a first continuous curvature transition portion from the first end of the intermediate portion, inclined out of the plane; and
a second arm extending via a second continuous curvature transition portion from the second end of the intermediate portion inclined out of the plane on the same side of the plane as the first arm, the first arm and the second arm each having an intermediate portion end and an opposite free end, each free end curving outwardly relative to the intermediate portion and back towards the plane and describing an angle of at least 120°, wherein the intermediate portion ends of the first and second arms are spaced from the respective first and second ends of the intermediate portion in respective directions parallel to the plane via the respective first and second continuous curvature transition portions extending therebetween.

2. The pad spring of claim 1 in which at least one of the first arm and the second arm includes a major portion having an arcuate shape.

3. The pad spring of claim 2 wherein a radius of the major portion is in a range of 250 mm to 400 mm.

4. The pad spring of claim 2 in which at least one of the first arm and the second arm has a center of curvature radially outward of the pad spring.

5. The pad spring of claim 1 in which the pad spring is formed from material having a thickness less than 1.6 mm.

6. The pad spring of claim 1 in which at least one of the first arm and the second arm is formed from two parallel spaced elements to form an aperture therebetween.

7. The pad spring of claim 1 in which at least one of the first arm and the second arm extends at an angle of 20° to 40° from the straight intermediate portion.

8. The pad spring of claim 1 in which at least one curved end describes an angle of at least 180°.

9. The pad spring of claim 1 in which the straight intermediate portion is 5 to 15 mm long in a tangential direction and/or is 10 mm to 20 mm wide in an axial direction.

10. The pad spring of claim 1 in which at least one of the first arm and the second arm is 45 mm to 50 mm long in a circumferential direction, measured when in a flat condition before forming.

11. The pad spring of claim 1 in which the pad spring is symmetrical about a center of the straight intermediate portion when viewed in an axial direction.

12. The pad spring of claim 1 in which the pad spring is made from metal.

13. A disc brake pad assembly comprising:
a mounting plate having opposing spaced abutments defining abutment depressions; and
a pad spring that includes:
a straight intermediate portion having opposite first and second ends and defining a plane;
a first arm extending via a first single arcuate transition portion from the first end of the intermediate portion, inclined out of the plane; and
a second arm extending via a second single arcuate transition portion from the second end of the intermediate portion inclined out of the plane on the same side of the plane as the first arm, the first and second arms each having an intermediate portion end and an opposite, free end curving outwardly relative to the intermediate portion and back towards the plane and describing an angle of at least 120°, wherein the intermediate portion ends of the first and second arms are spaced from the respective first and second ends of the intermediate portion in respective directions parallel to the plane via the respective first and second single arcuate transition portions extending therebetween, and wherein each free end fits into an abutment depression in a circumferentially restrained manner such that application of a load to the pad spring at the straight intermediate portion results in stresses being reacted with a substantial resultant in a circumferential direction.

14. The disc brake pad assembly of claim 13 in which a ratio of circumferential lengths of the pad spring and mounting plate is 1:3 to 1:1.9.

15. The disc brake pad assembly of claim 13 in which at least one of the first and second arms has a major portion having an arcuate shape.

16. The disc brake pad assembly of claim 15 in which at least one of the arcuate shaped arms has a center of curvature radially outward of the pad spring.

17. The disc brake pad assembly of claim 13 in which the pad spring is formed from material having a thickness less than 1.6 mm.

18. The disc brake pad assembly of claim 13 in which at least one of the first arm and the second arm is formed from two parallel spaced elements to form an aperture therebetween.

19. The disc brake pad assembly of claim 13 in which at least one of the first arm and the second arm extends at an angle of 20° to 40° from the straight intermediate portion.

20. A pad spring for a brake assembly, the pad spring comprising:
a straight intermediate portion having opposite first and second ends and defining a plane;
a first arm extending via a first single arcuate transition portion from the first end of the intermediate portion, inclined out of the plane; and
a second arm extending via a second single arcuate transition portion from the second end of the intermediate portion inclined out of the plane on the same side of the plane as the first arm, the first arm and the second arm each having an intermediate portion end and an opposite, free end curving outwardly relative to the intermediate portion and back towards the plane and describing an angle of at least 120°, wherein the intermediate portion ends of the first and second arms are spaced from the respective first and second ends of the intermediate portion in respective directions parallel to the plane via the respective first and second single arcuate transition portions extending therebetween.

* * * * *